Nov. 1, 1966   L. U. C. KELLING   3,283,129
PULSE RATE MULTIPLIER FOR CONTROL SYSTEM
Original Filed Sept. 5, 1961   7 Sheets-Sheet 1

INVENTOR.
LEROY U. C. KELLING
BY James G. Williams
HIS ATTORNEY

INVENTOR.
LEROY U.C. KELLING

BY
*Irving Kayton*
ATTORNEY

Nov. 1, 1966          L. U. C. KELLING          3,283,129
PULSE RATE MULTIPLIER FOR CONTROL SYSTEM
Original Filed Sept. 5, 1961                  7 Sheets-Sheet 3

INVENTOR.
LEROY U.C. KELLING
BY
ATTORNEY

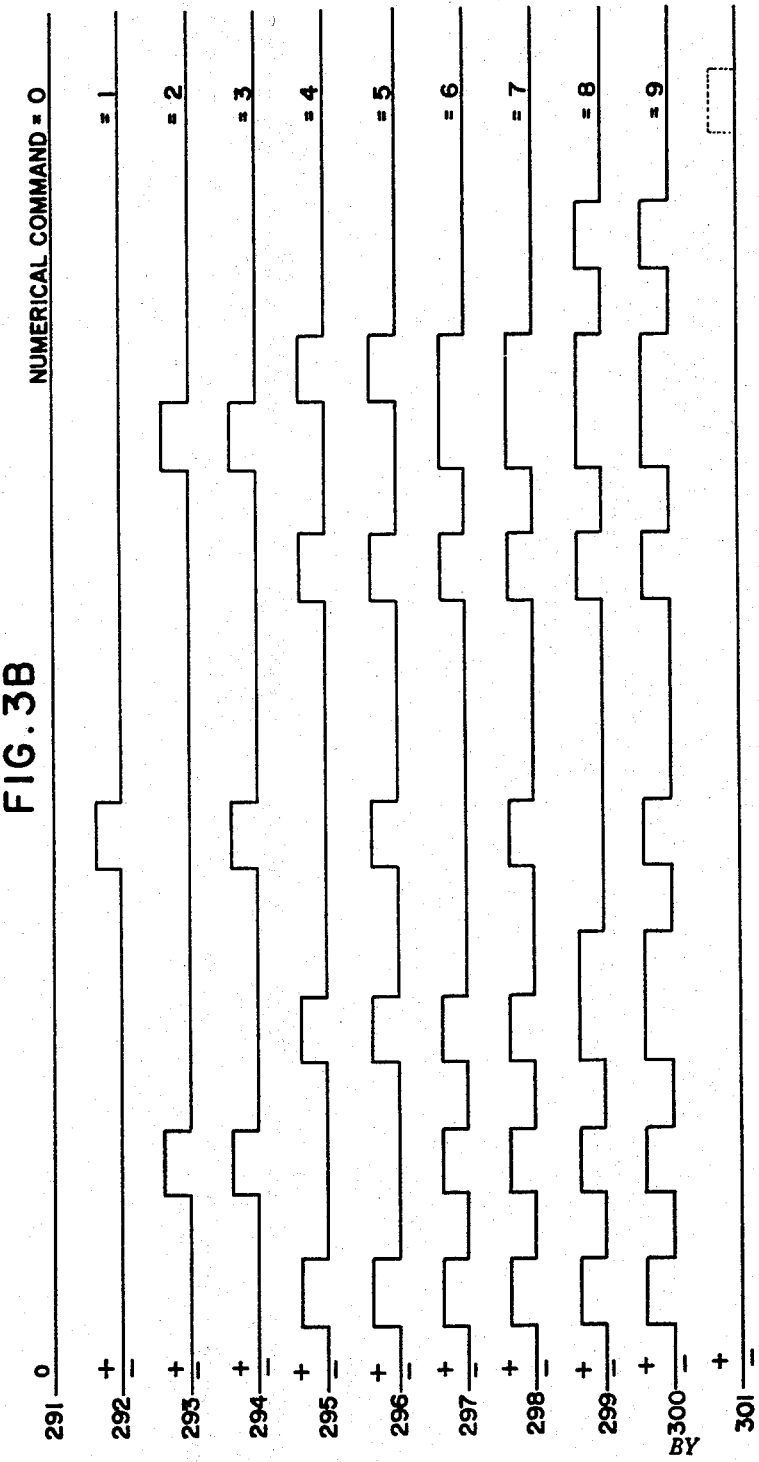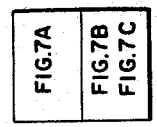

Nov. 1, 1966   L. U. C. KELLING   3,283,129
PULSE RATE MULTIPLIER FOR CONTROL SYSTEM
Original Filed Sept. 5, 1961   7 Sheets-Sheet 5
PULSE RATE MULTIPLIER PATTERNS   FIG. 4A.
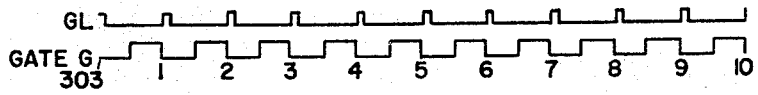
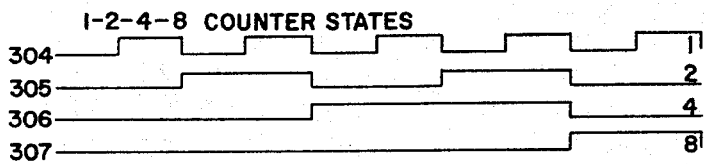
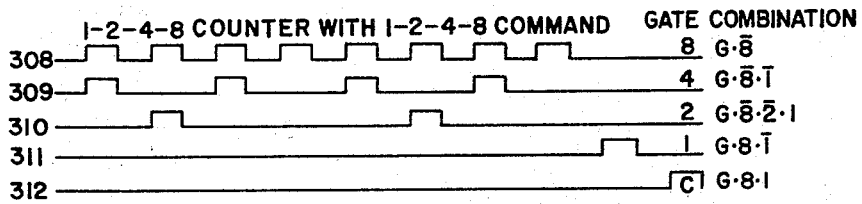
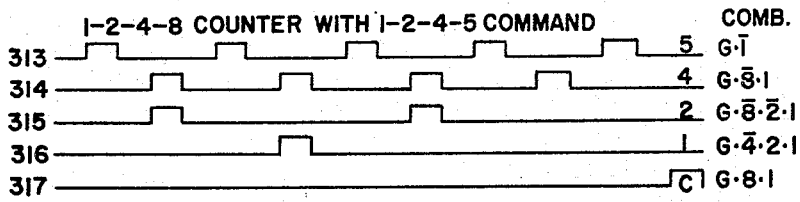
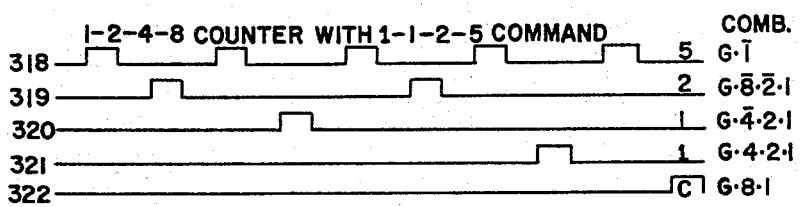
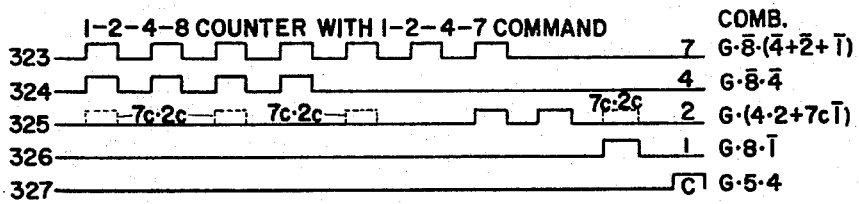
INVENTOR.
LEROY U.C. KELLING
BY
Irving Kayton
ATTORNEY

Nov. 1, 1966 L. U. C. KELLING 3,283,129
PULSE RATE MULTIPLIER FOR CONTROL SYSTEM
Original Filed Sept. 5, 1961 7 Sheets-Sheet 6
PULSE RATE MULTIPLIER PATTERNS FIG. 4B.
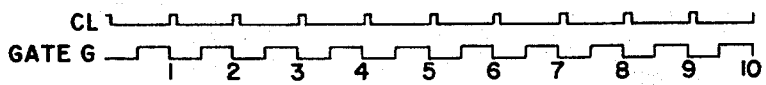
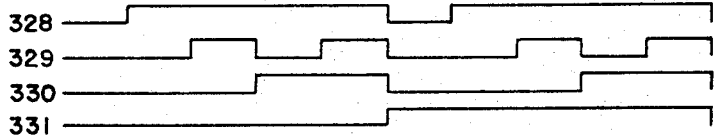
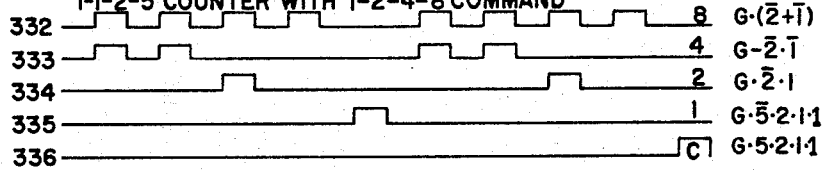
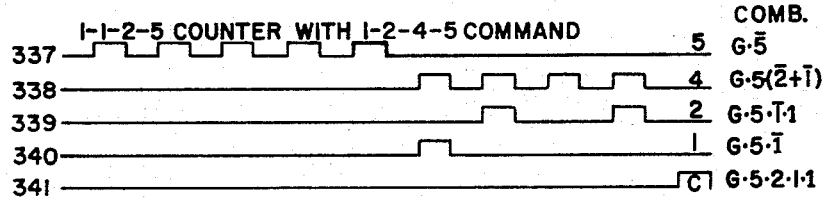
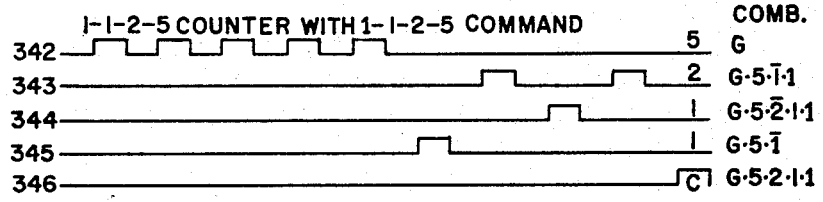
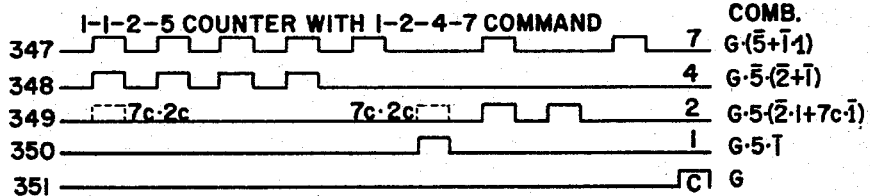
INVENTOR.
LEROY U. C. KELLING
BY
*Irving Kayton*
ATTORNEY

INVENTOR.
LEROY U.C. KELLING

United States Patent Office 3,283,129
Patented Nov. 1, 1966

3,283,129
PULSE RATE MULTIPLIER FOR CONTROL SYSTEM
Leroy U. C. Kelling, Waynesboro, Va., assignor to General Electric Company, a corporation of New York
Original application Sept. 5, 1961, Ser. No. 136,420, now Patent No. 3,226,649, dated Dec. 28, 1965. Divided and this application Mar. 4, 1965, Ser. No. 453,533
17 Claims. (Cl. 235—92)

This is a divisional application of my copending application entitled "Pulse Train Phase Modulator For Control System," which was filed September 5, 1961, Serial No. 136,420, now Patent No. 3,226,649.

This invention has to do with electronic automatic control systems, and more particularly with numerical control systems for controlling the motion, in a preferred embodiment, of the cutting element of a machine tool relative to the workpiece in order to describe a contoured or complicated cutting path on the workpiece.

In the class of machine tool control equipment known as "Numerical Contouring Control" systems, the magnitude of the commanded velocity of the workpiece relative to the cutting tool is of great importance at every instant during the cutting operation. Consider, in a metal milling machine, cutting an irregular shape involving a combination of straight lines and circular arcs in the surface of a metallic plate. The optimum velocity with which workpiece and cutting tool move relative to each other in this situation are determined by several limiting factors in addition to the desire to proceed with the operation as rapidly as possible. For example, the thickness of the metal to be cut, the composition of the alloy or compound of which the metal is comprised, the hardness and melting point of the cutting tool, the amount and type of coolant that may or may not be applied to the cutting tool as it cuts through the metal are factors that enter into the consideration of the optimum speed. Too high a velocity of relative motion results in damaging the workpiece, or the cutting tool, or both. In contouring control, therefore, direct and positive velocity control is required at all times.

Of equal importance is control of the path length and direction of the cut or sequence of path cuts. Since contour cutting often involves intricate path shapes, the displacement of the cutting tool relative to the workpiece must be under constant, and carefully predetermined control.

The requirements of contouring control may be considered analogous to some of the modern safety driving tests or races recently developed for both automobiles and pleasure boats. In such races, the course that the vehicle must travel is carefully predetermined and a safe speed is also carefully determined for each leg of the route. The winner of such a race is the one who comes closest to following the prescribed route at the predetermined safe speed.

The predetermined speed, path length and direction for each leg or cut which the machine tool is constrained to follow under the direction or command of a contouring control system is typically fed into the control system in numerical form programmed on punched tape or punched cards, although in certain applications magnetic tape containing the digital information is used. This numerical input data is routed to appropriate sub-systems of the control system, whereupon the control function is set into operation. In order that the numerical information be utilized by the electronic control equipment, the input data must be presented in an electrical form compatible with the overall system and which enables the control system to accurately control the speed and path of the machine tool relative to the workpiece.

One form of representation of the velocity and path length data, known in the art, is a train of electrical pulses. In such a representation, each pulse in the train corresponds to a discrete increment of motion of the cutting tool relative to the workpiece, such that if the control system generates X pulses, the machine tool, in obeying the command of the control system, moves a distance of X times the incremental distance defined by each pulse.

In the preferred embodiment, herein subsequently to be described, the incremental distance represented by each pulse is .0001 of an inch. If the control system were to generate 100,000 pulses, for the purpose of determining a path length, then the total motion that would be traversed by the cutting tool relative to the workpiece would be 100,000 times .0001, or 10 inches.

When each pulse represents an incremental distance, the frequency of the pulses, i.e., the pulse repetition rate, defines velocity and may be used to control the speed of motion of the machine tool. This is so, since pulse rate is convertible into increments of distance per unit time. In the preferred embodiment, the length of each cut is commensurate with numbers of pulses, and speed of motion of the cutting tool relative to the workpiece is commensurate with pulse frequency or rate.

A reference or basic source of pulses (a pulse clock) is required for the purpose of generating the pulse frequency which is to be the standard of the system and from which other pulse rates may be generated for use in various parts of the system. Since speed of motion is commensurate with pulse rate in the contouring control system, means must be provided for dividing the reference or clock pulse rate to obtain any desired fraction of that rate in accordance with the commanded speed of motion.

It is known in the art to divide a pulse rate with apparatus sometimes called a "Pulse Rate Multiplier." The function of the Pulse Rate Multiplier, hereinafter referred to as PRM, is to take any clock pulse frequency and derive therefrom the required pulse rate which is a fraction thereof. The PRM is sometimes called, in the art, a pulse train (or rate) divider. The requirements of the system in accordance with the instant invention place a stringent condition on the operation and nature of the output of any pulse rate multiplier operation that is performed. Since speed of motion is commanded by pulse rate, it is imperative that the divided output of the PRM be represented by a pulse rate with reasonably uniform recurrence of pulses, but subject to the additional restriction that the output pulses be in synchronism with pulses of the clock pulse frequency. Thus, if a PRM were to provide an output which has the requisite number of pulses per unit time, but wherein the pulses are bunched in their distribution in that unit of time, the operation of the contouring control system would be severely hampered. Indeed, prior art PRM's operating in the same numerical code as the instant control system suffer from the disadvantage that the output pulses thereform are non-uniformly distributed with respect to time. Uniformity of pulse distribution is required in order that the electronic components elsewhere in the system properly be able to utilize such a pulse distribution as a parameter commensurate with commanded velocity.

A pulse rate multiplier comprises a counter, logic gates and storage register for counting the input pulse train so as to divide it into a series of non-coincident pulse trains of different pulse rates some of which are combined into an output pulse train in response to the command number stored in the storage register. The output pulse rate is equal to the product of the input pulse rate and the command number, divided by a number equal to the counter capacity.

In accordance with the principles of the invention, a PRM is provided wherein the storage register operates to store a command number in one digital code, while the counter operates in a second and different digital code. The two different codes selected for the counter and the register are uniquely related to provide an output from the PRM that not only consists of the requisite number of pulses per unit time, but wherein the pulses are substantially uniformly distributed with respect to time. It was discovered that by having a counter operative in a code related to the code of the register in a special way, this uniform distribution of pulses with time is possible without the necessity of elaborate and expensive auxiliary equipment for subsequently properly spacing the pulses in the train.

The general organization of the automatic control system comprehends that the path length and velocity commands of the control system are represented by the phase and rate of change of phase, respectively, of a pulse train applied to a servo mechanism which in turn is coupled to, and drives, the machine tool. A sensing mechanism observes the position of the machine tool as the machine tool responds to the command signals, and generates a pulse train whose phase relative to a reference is representative of the present actual position of the machine tool. The phase of the command position signal is compared with the phase of the actual position signal so that an error signal directly proportional to the phase difference may be generated to provide feed back control in the feed back loop of the servo mechanism. The magnitude of the error signal, and its sense or polarity (determined by whether the phase of the command signal leads or lags that of the actual position signal) causes the machine tool to move in such direction as to tend to reduce the magnitude of the error signal.

The same basic pulse rate and phase relative to a reference is provided for the command signal as for the machine tool feed back signal so that, with a commanded velocity of zero and an actual tool velocity of zero, two equal frequency and in-phase pulse rates are applied to the comparison means. This results in a zero difference or error signal, and nothing happens. When the commanded velocity is other than zero, means is provided for continuously changing the phase of the basic pulse command signal relative to the reference. Comparison of this phase modulated command pulse train with the phase of the feed back signal of the machine tool which is still at rest will indicate a phase difference increasing in magnitude.

The means known in the art, for phase modulating the pulse train proportional to commanded velocity, is a counter to which the basic unmodulated pulse train is applied as an input, and with which the pulses of an additional pulse train whose rate is commensurate with command velocity, are inter-leaved. In this way, the output of the counter is the sum of the two pulse trains. Such an arrangement, however, requires a counter which must be operative at a pulse rate which is at least double that of the basic clock pulse rate, since additional pulses are inter-leaved therebetween.

It is possible to add pulses to, or subtract pulses from, the basic pulse rate (or to permit the basic pulse rate to be counted undisturbed) with a counter which need operate at no higher pulse rate than the basic pulse rate commensurate with a commanded velocity of zero. The second pulse rate is applied to the counter in synchronism with the basic pulse rate, rather than inter-leaved therewith. The first or input decade of the counter, however, is a variable rate counter decade. This decade will either count regularly, or will count two for each input pulse, or will not count at all for an input pulse, dependent upon whether the basic pulse train is to be left undisturbed, or to be added to, or subtracted from, respectively.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings.

Figure 3A:
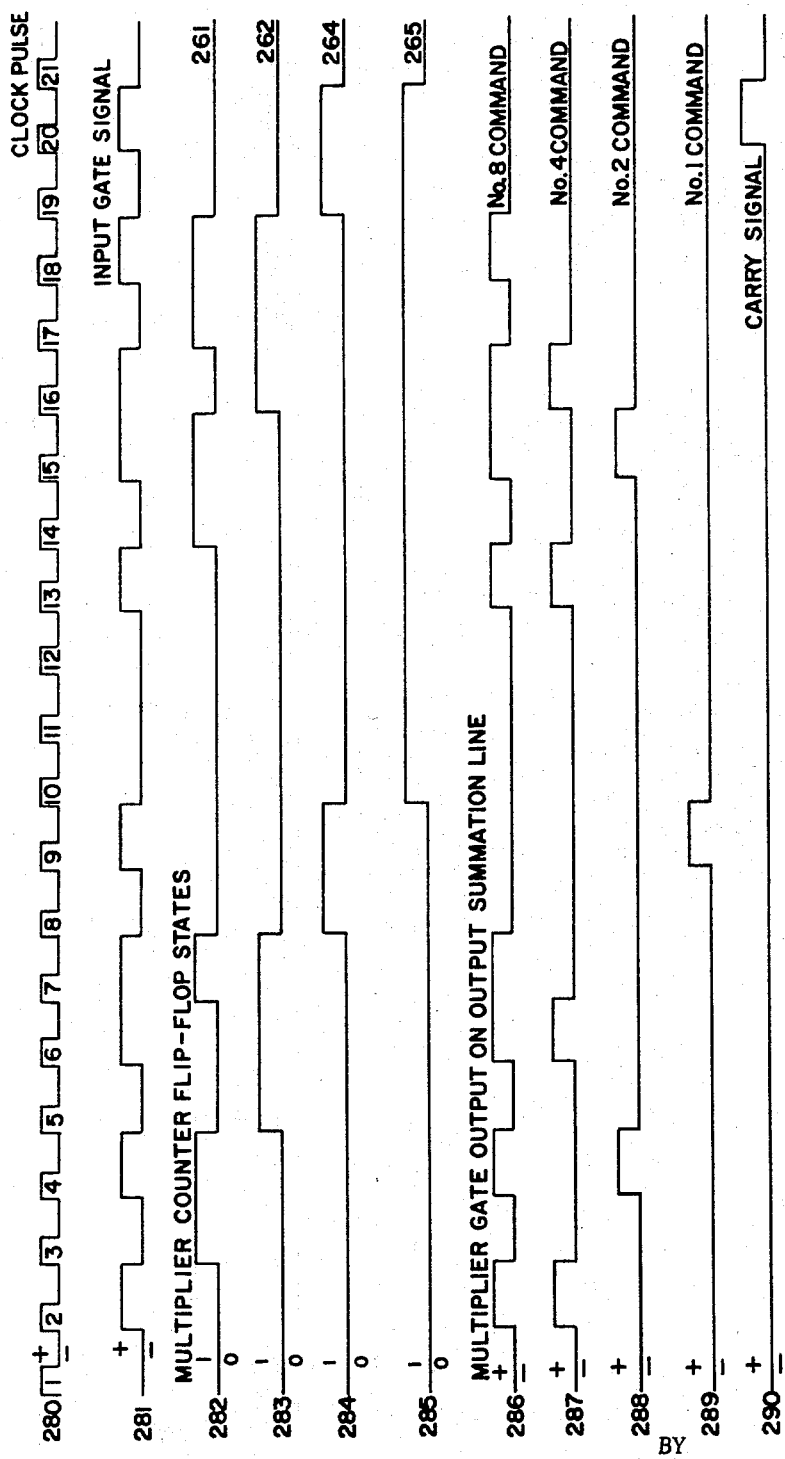
Figure 4C:
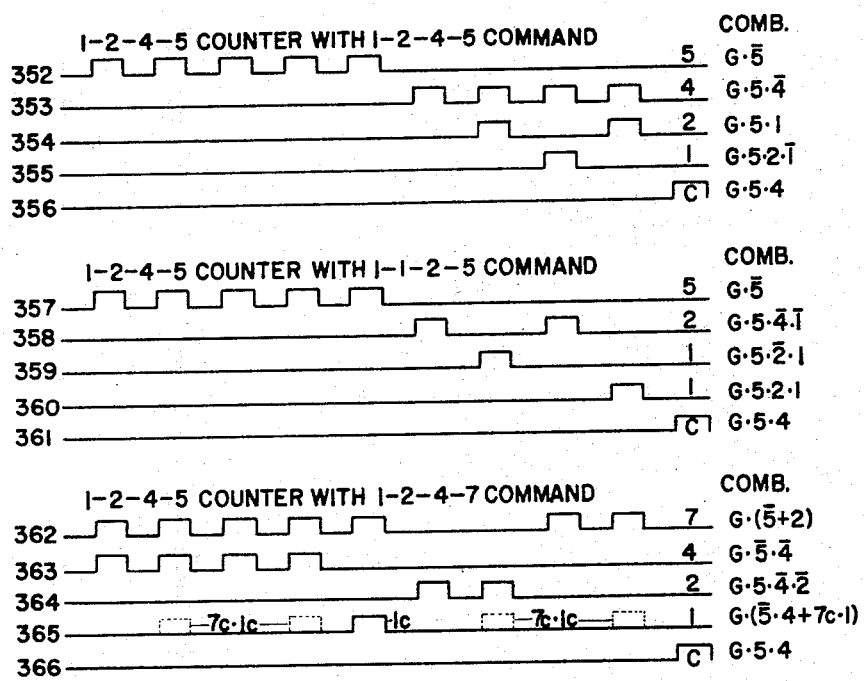
Figure 4D:
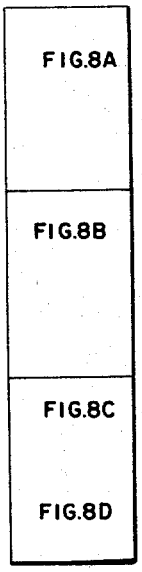

FIGS. 3A and 3B, taken together as in FIG. 3C, are a timing diagram of the waveforms produced in the pulse rate multiplier; and FIGS. 4A–4C, taken together as in FIG. 4D, are a timing diagram of the waveforms of other combinations of chosen pulse rate multiplier counter and working command storage binary-coded-decimal weightings.

NUMERICAL CONTOURING SYSTEM— IN GENERAL

Figure 1:
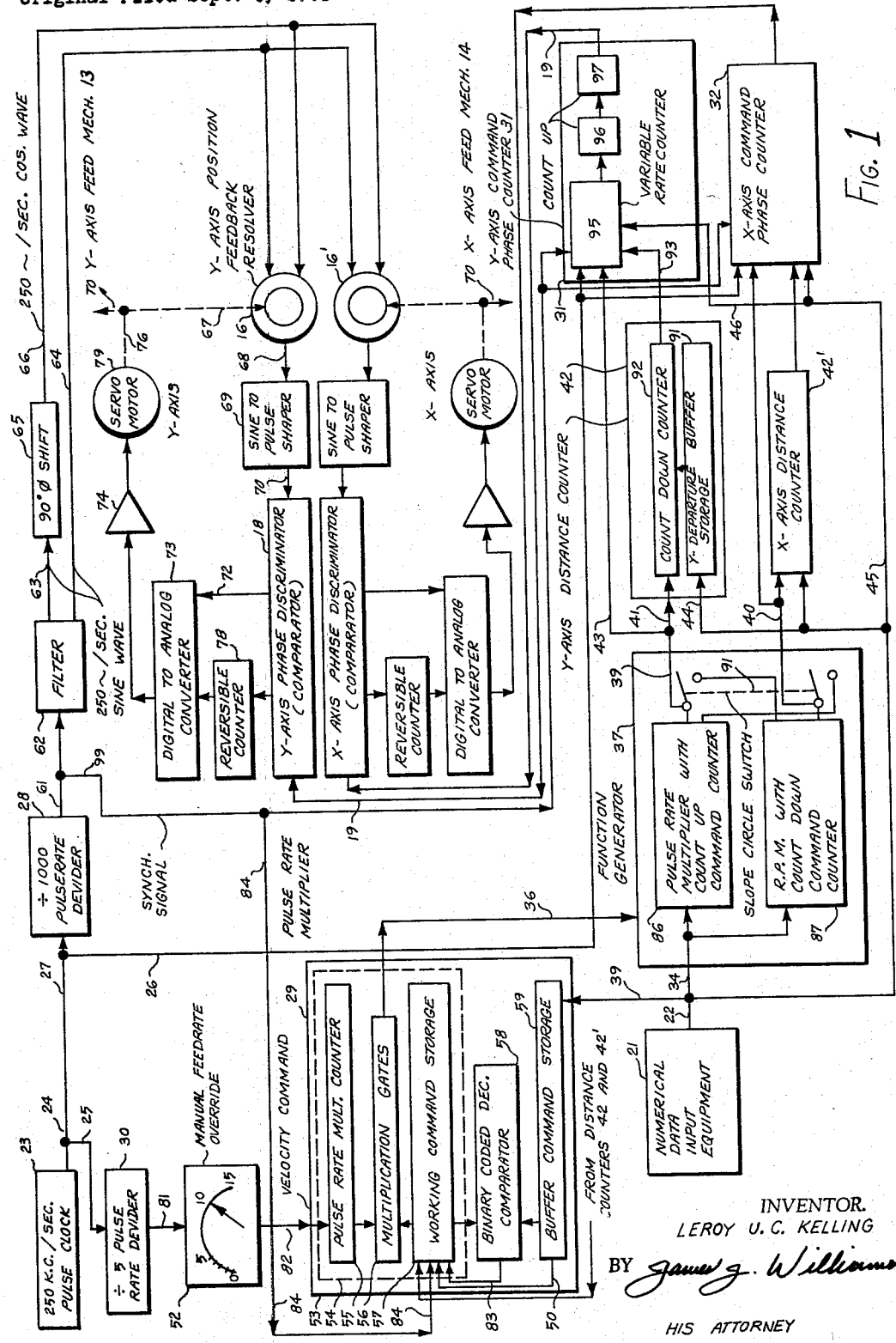
FIG. 1 is a block diagram of a numerical contouring control system shown in sufficient detail to highlight the environment within which the various features of the invention are found.

Referring to FIGURE 1, there is disclosed a general block diagram of the overall numerical contouring control system. FIGURE 1 is presented primarily to show the interrelationship of the three broad sections of the system; they are the machine tool itself, the servo system loop, and the overall electronic control section. The machine tool and the control section are coupled by the servo mechanism loop. The description relative to FIGURE 1 of the overall function of the system, and broad relationship of the sub-systems within these three sections, will provide a basis for more readily comprehending the detailed description of the system arrangement and operation, as well as the detailed logic circuitry of the sub-systems which highlight the various aspects of the invention, and which will subsequently be described in detail.

The numerical contouring control system, as represented in FIGURE 1, may be viewed as comprising three broad sections. The purpose of the entire system, of course, is to control, automatically, a machine tool by a Y-axis feed mechanism 13, and an X-axis feed mechanism 14. Feed mechanisms 13 and 14 comprise appropriate drive shafts and gearing which actuate the machine element for motion along the two coordinates. It is to be understood that the system may be utilized for controlling machine elements in additional coordinates, but to simplify the explanation of the principles of the invention, a description of the third coordinate has been omitted. The machine element may be the cutting tool, itself, or may be the table holding the workpiece which is to be contoured. Alternatively, feed mechanisms 13 and 14 may control both the cutting tool and the motion of the workpiece. For the purposes of this discussion, assume that the machine element represents the cutting tool.

There is a servo loop for each of the two feed mechanisms. The Y-axis servo loop and the X-axis servo loop are structurally independent of each other in their action in driving the feed mechanisms. Since the equipment throughout the system for the X coordinate is precisely the same as for the Y coordinate, solely the Y coordinate system will be described, except where a discussion of the equipment of both coordinates is required for clarification. The Y-coordinate servo loop comprises a Y-axis position servo, including a D.C. amplifier driving a servo motor 75 which actuates the Y-axis feed mechanism 13. Simultaneously, the motor 75 drives the Y-axis position feed back synchro resolver 16. The output of the position feed back resolver 16 provides an electrical representation of the position of the machine in the Y-coordinate since both the feed mechanism 13 and resolver 16 are driven in common by the position servo motor 75.

The resolver 16 is coupled to the Y-axis phase discriminator or comparator 18. The discriminator's function is to compare the actual position of the machine in the Y-coordinate, as represented by the Y-axis position feed back resolver 16, on the one hand, with the commanded position from the control section. Thus, the phase of the command signal entering the Y-axis phase discriminator 18 from the left on lead 19 is compared with the phase of the actual feed back position signal which comes into discriminator 18 from the resolver 16. The difference in the phase between the command signal and the feed back signal is commensurate with the difference between the commanded position and the actual position. This phase difference is utilized for generating an error signal which is then fed into the servo mechanism. The servo mechanism drives the Y-axis feed mechanism in accordance with the instantaneous error signal. The servo mechanism loop, therefore, comprises the Y-axis position servo, the Y-axis position feed back synchro resolver 16 and the Y-axis phase discriminator 18. Discriminator 18 is also common to the control section now briefly to be outlined.

The input to the control section of the overall numerical contouring control system is the numerical input data equipment block 21 which accepts numerical command data. Input equipment 21 may be a punched tape, punched card, or magnetic tape, digital input sub-system. For the purposes of the numerical contouring control system under discussion, punched tape has been found to be particularly advantageous. Numerical input data equipment 21 reads the instructions and addresses on the input tape so as to generate the appropriate electrical signals requisite for controlling the machine element.

Typically, the numerical input information is in a coded digital form related to the speed with which the cutting element is to travel while performing its contouring function; it also indicates the X and Y departures and their direction for that cut, or the arc center offsets of the circular path to be generated if that particular cut is to be an arc of a circle. The instructions from input equipment 21 are then routed throughout the control section in accordance with the programmed addresses.

Another type of input is also provided for the control section in the form of a train of pulses generated from a reference clock or oscillator 23. This pulse clock, as is well known in the digital computer art, provides the carrier by which the command signals are transported throughout the control section; it also provides a reference pulse rate input to the servo loop section. Thus, the output of the pulse train generator or clock 23 is applied along its output lead 24 to both the control section of the contouring system along leads 25 and 26, and also to the servo loop section on lead 27. Lead 27 is coupled to the input of the position feed back resolver 16 through the intermediary of a pulse rate divider 28, while the output from clock 23 is applied to the control section on lead 25 as an input to the velocity command block 29, through the intermediary of the pulse rate divider 30. There is no pulse rate divider in lead 26 between clock 23 and the Y-axis command phase counter 31. The insertion of pulse rate divider 30 in lead 25, and divider 28 in lead 27, as well as the absence of a pulse rate divider in lead 26, result in adapting the reference pulse rate from clock 23 for use in different parts of the system having different functions and operating characteristics.

The pulse rate fed into the control section, and the total number of pulses fed into the control section for any given path, define the commanded velocity with which it is desired the machine tool shall move and the total length of the path it is desired that the machine tool traverse. In short, the pulse rate and the total number of pulses are the mechanisms upon which the electronic equipment in the control section operate to provide command signals, subsequently to be converted into the velocity and distance of travel executed by the machine tool.

The function of the velocity command block 29 is to convert a reference pulse rate entering from the pulse rate divider 30 into a pulse rate represented by a number (commensurate with required velocity of motion) punched into the input tape and fed into the system at input data equipment 21. This number is referred to as the feed rate number.

The feed rate number is therefore applied from input 21 along leads 22 and 35 as another input to the velocity command 29. If the punched tape commands a feed rate number of 200 inches per minute, the velocity command 29 would operate upon the pulse rate to provide an output pulse rate on lead 36 of 33.3 kilocycles per second (which is equal to 200 inches per minute with each pulse representing .0001 of an inch). Velocity command block 29 also performs the very important functions of manual feed rate over-ride and automatic acceleration and deceleration. The output pulse rate, commensurate with command velocity, is applied on lead 36 to the function generator 37.

The function generator operates in two modes. The first mode generates command signals for straight line cuts at any angle, sometimes referred to as slope generation or linear interpolation. The second mode generates command signals to perform circular line cuts with a specified radius, also referred to as circular interpolation. For the purposes of discussion relative to FIGURE 1, consider function generator 37 in its relationship to the rest of the system operating solely in the first mode as a slope generator.

Function generator 37 resolves the command velocity entering on lead 36 into two component pulse rates commensurate with required velocities in the X and Y directions. This resolution is performed in accordance with the X and Y departures programmed into the punched tape and applied to the function generator 37 from input equipment 21 along the leads 22 and 34. Thus the input pulse rate to function generator 37 is multiplied by a factor which is directly proportional to the sine of the slope angle of the path cut relative to the X axis to obtain the required Y component of velocity, and is multiplied by the cosine of that angle in order to obtain the required X component of velocity. The X and Y outputs of function generator 37, therefore, are two pulse rates commensurate with the Y and X components of velocity required for the motion of the cutting tool. The X and Y pulse rates are applied as outputs on lead 40 and 39, respectively. Between 39 and 40, and the X and Y feed mechanisms 13 and 14 of the machine tool, the circuitry for handling the output on lead 39 is identical to that for the output on lead 40. Accordingly, the following discussion will be restricted to the Y coordinate system.

The Y pulse rate output on lead 39 from the function generator 37, is applied to two different circuits, simultaneously. Along lead 41 from lead 39, it is applied to the Y-axis distance counter 42, while along lead 43 from lead 39, it is applied to the Y-axis command phase counter 31. Distance counter 42 controls the length of the path along which the machine travels for the cut being made. Command phase counter 31 controls (relative to the position feed back resolver 16 through the intermediary of the discriminator 18) the velocity of motion of the machine for the cut.

Since each pulse represents an incremental distance which the cutting tool travels, counting the pulses in distance counter 42 that exit from function generator 37 is the same thing as measuring the distance which the cutting tool travels along the path. When counter 42 totals a number of pulses equal to the desired path length, its operation stops as does the movement of machine tool cutting element. Counter 42 is informed at the beginning of each path, as to the total count required to achieve the desired path length. This input data is applied to counter 42 from input equipment 21 along leads 22 and 44.

The motion of the machine tool is controlled in the command phase counter 31. In command phase counter 31, not only is the required Y coordinate pulse rate applied thereto along lead 43, but the reference clock pulse rate is also applied as an input from clock 23 along leads 24 and 26. Consider what happens if the Y feed rate command requires no motion in the Y direction, and the simultaneous condition that the machine tool is at rest in correspondence with the command. Under these circumstances, the pulse rate output from function generator 37 on lead 39 is zero, thereby maintaining a constant phase on the phase modulated pulse train output from phase counter 31. Both phase counter 31 and resolver 16 are adapted to provide outputs which are of precisely the same pulse rate, and in phase, under these conditions. Accordingly, there is a zero error signal output from phase discriminator 18 and the cutting element remains motionless. However, if a pulse rate output from function generator 37 does appear on leads 39 and 43, and therefore a pulse train representing a commanded velocity is fed into command phase counter 31, then the pulses on lead 43, as well as the clock pulses on lead 26, are counted by phase counter 31. If the direction of motion commanded by the programmed tape is in a negative direction, the pulses on lead 43 are subtracted from the clock pulses in the command phase counter. Whether the direction is positive or negative with respect to the Y coordinate, is indicated to command phase counter 31 by a signal applied from the input equipment 21 along leads 22, 45 and 46. The addition or subtraction of pulses in the command phase counter 31 has the net effect of either advancing or retarding the phase of the output pulses from the phase counter on lead 19, respectively, relative to the output pulse train from the synchro resolver 16. Accordingly, the position servo drives the Y-axis feed mechanism in the appropriate direction and at a rate proportional to the error signal developed in discriminator 18. As Y-axis feed mechanism 13 continues its motion, it will eventually traverse the entire distance required for the specific cutting operation. When this distance is completed, it is recognized in the Y-axis distance counter 42 and a blocking signal is generated therefrom along lead 93. This blocking signal is applied to command phase counter 31 in a manner so as to stop the input thereto from function generator 37. When this happens, pulse rate signals can no longer be added to the clock pulse rate in command phase counter 31, with the result that the phase of the output from phase counter 31 can no longer be changed.

*Pulse rate multiplier (FIGS. 2, 3A–3C)*

Figure 2:
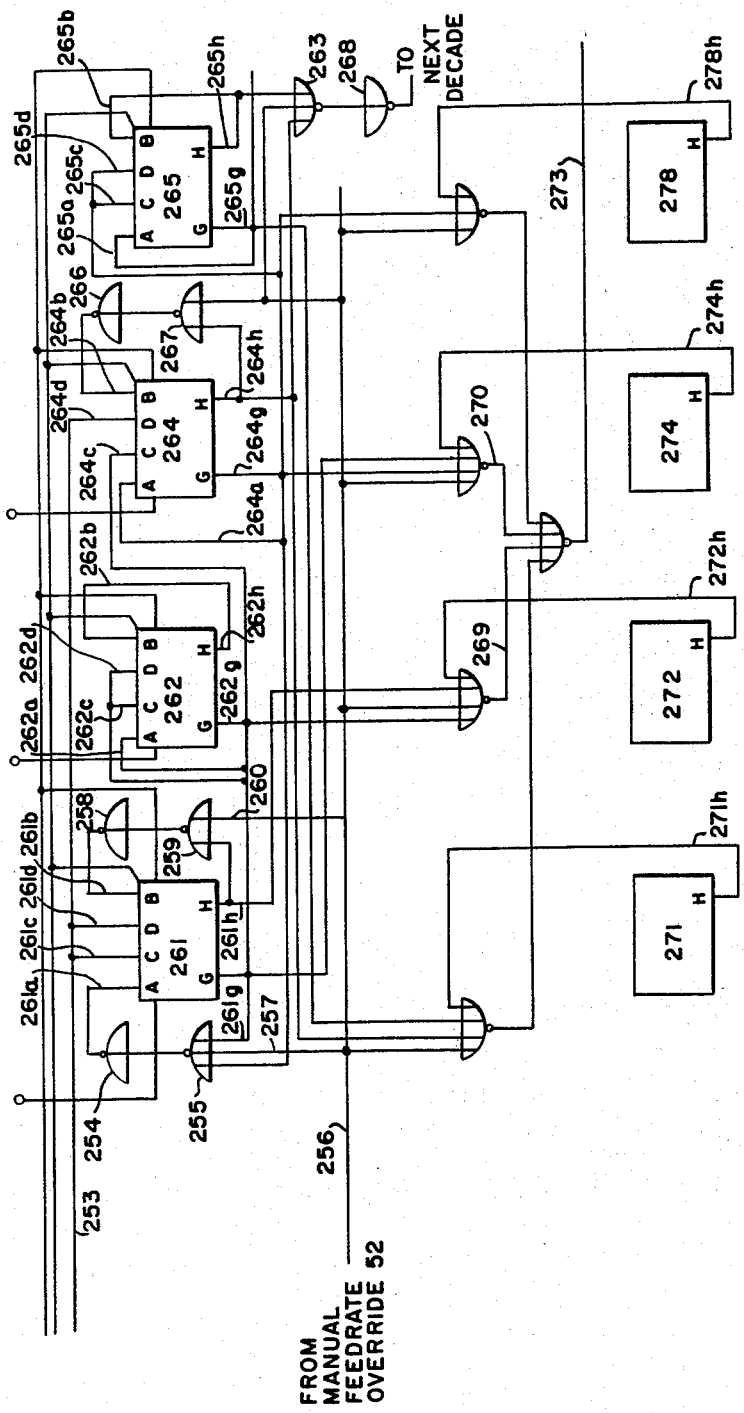
FIG. 2 is a diagram of a pulse rate multiplier which is suitably employed in the velocity command indicated in FIG. 1.

In FIG. 2, there is shown an arrangement of a single decade of a pulse rate multiplier. It is, of course, to be understood that the pulse rate multiplier may comprise a plurality of decades and one decade has been selected to provide convenience of explanation of operation. In FIGS. 3A–3C, there is shown a timing diagram of the waveforms which occur in the operation of the arrangement of FIG. 2. In this latter connection, the multiplier of FIG. 2 is arranged to function whereby the output thereof provides a pulse train wherein the amount of pulses for a given duration is equal to one half the amount of clock pulses applied to the multiplier.

Referring now to FIG. 2, it is seen that the pulse rate counter portion of the multiplier comprises flip-flops 261, 262, 264, and 265 weighted 1, 2, 4 and 5 respectively.

In the operation of the counter, the clock pulses from the divider 30 are applied on lead 253 (which corresponds to lead 81 in FIG. 1) and thence on leads 261c, 261d, and 264d. The steering lead 261a has applied thereon the output of an inverter 254, there being applied to inverter 254 the output of a three input gate 255, the inputs to the gate being the G output of flip-flop 261 on line 261g, the input gate signal appearing on line 256 and thence on line 264g. In this latter connection, the waveform of the clock pulse train and the waveform of the input gate signal train are shown on lines 280 and 281 in FIGS. 3A–3C. The input gate signal may be provided at the output of a device such as manual feedrate override 52.

In lines 280 and 281, it is seen that there are ten input gate pulses to every 20 clock pulses. It is further to be noted that in lines 280 and 281, the base line represents the upper logic level and the pedestal of the pulses represents the lower logic level which as has been explained above have been chosen to be zero volts and + six volts respectively.

The input applied on steering lead 261b is the output of an inverter 258, there being applied to inverter 258, the output of a two input gate 259, the latter inputs being the H output of flip-flop 261 on lead 261 H and the input gate signal from line 256 which appears on lead 260 (which corresponds to lead 82 in FIG. 2).

The input on leads 262c and 262d is provided from the output on line 261g. The input on line 264c is the output on line 262g and the input on line 264d is the clock pulse from line 253. The input applied on steering lead 264b is the output of an inverter 266 to which there is applied the output of a two input gate 267, the inputs to gate 267 being the output on lead 264h and the input gate signal from line 256. The input applied on leads 265c and 265d is the output on lead 264g.

If it is assumed that flip-flops 261, 262, 264 and 265 are all initially in their zero states, then upon the appearance of a binary zero on line 256, i.e., when an input gate pulse appears with flip-flops 261 and 264 both in their zero states, flip-flop 261 is switched to its one state. This can be seen by the examination of line 282 in FIGS. 3A–3C. It is shown therein that at the coincidence of the leading edge of the third clock pulse and the trailing edge of the first input gate signal, flip-flop 261 is switched to its one state. In this latter connection, it is to be noted that the waveforms showing the outputs of the flip-flops in the counter have as their bases the binary zero voltage level and as their pedestals the binary one level which, of course, is the reverse of the voltage levels shown in lines 280 and 281.

With the switching of flip-flop 261 to its one state, a binary one appears on leads 262c and 262d. Now, upon the coincidence of the trailing edge of the second input gate pulse and the leading edge of the fifth clock pulse, flip-flop 261 is switched back to its zero state whereby the level on leads 262c and 262d goes from binary one to binary zero, i.e., from zero volts to +6 volts and consequently flip-flop 262 is switched to its set state. Upon the coincidence of the trailing edge of the third input gate pulse and the leading edge of the seventh clock pulse, flip-flop 261 is again switched to its one state. However, since no pulse appears simultaneously on leads 262c and 262d, flip-flop 262 remains in its one state. Thereafter, at the coincidence of the trailing edge of the fourth input gate pulse and the leading edge of the eighth clock pulse, flip-flop 261 is switched back to its zero state and flip-flop 262 is also switched to its zero state since such switching of flip-flop 261 produces a pulse on leads 262c and 262d.

At the time that flip-flop 262 is switched to its one state, a binary one appears on lead 264c. When flip-flop 262 is switched back to its zero state, a pulse appears on lead 264c and flip-flop 264 is consequently switched to its one state at the same time. Upon the coincidence of the trailing edge of the fifth input gate pulse and the leading edge of the tenth clock pulse, flip-flop 261 cannot be switched to its one state because there is a binary one logic level on lead 264g. However, since there is a binary zero on lead 264b and since a clock pulse is applied on lead 264d, flip-flop 264 is switched to its zero state.

At the time that flip-flop 264 is switched to its one state, a binary one appears on leads 265c and 265d. When flip-flop 264 is switched back to its zero state, a pulse appears on leads 265c and 265d whereby flip-flop 265 is switched to its one state.

The foregoing cycle now repeats itself for the ensuing five input gate pulses. It is appreciated that upon the coincidence of the trailing edge of the tenth input gate pulse and the twentieth clock pulse flip-flops 264 and 265 are both switched to their respective zero states and the flip-flops of the counter are all in their zero state at this time. Lines 282, 283, 284 and 285 show the waveforms of the G outputs of the flip-flops during the ten input gate pulse cycle.

The H outputs of flip-flops 264 and 265 and the input gate signals on line 256 comprise the inputs to a three input gate 263. At a time when flip-flops 264 and 265 are both in their one state, i.e., when the value of one setting of the counter is nine and upon the coincidence of the leading edges of the twentieth clock pulse and the tenth gate pulse, a binary one appears at the output of gate 263. This binary one input is inverted in inverter 268, the output of inverter 268 being the carry pulse to the next decade of multiplication gates. When the G output of flip-flop 265 goes from one to zero at the trailing edge of the tenth gate pulse, a zero is applied on the $c$ and $d$ leads of the "1" flip-flop of the next significant decade of the counter and it is switched to its one state. Line 290 in FIGS. 3A–3C shows the waveform of the carry pulse. It is seen that in this waveform, the pedestal and the base are shown according to the upper and lower voltage levels.

In the working command storage portion of the pulse rate multiplier flip-flops 271, 272, 274, and 278 are respectively weighted 1, 2, 4 and 8 and provide one of the decades of the working command storage. In actuality, the working command storage is connected to function as a reversible counter. However, in FIG. 2 only the H output leads are shown for convenience of explanation of operation.

It is, of course, to be realized that if the pulse rate multiplier comprises a plurality of decades such as three, for example, the outputs of the flip-flops comprising the most significant decade of the working command storage are combined with the outputs of the flip-flops comprising the least significant decade in the pulse rate multiplier counter in the multiplication gates and correspondingly the outputs of the flip-flops of the least significant decade of the working command storage are combined with the outputs of the flip-flops of the most significant decade of the pulse rate multiplier counter in the multiplication gates. Thus, if the pulse rate counter in FIG. 2 is the least significant decade of a pulse rate multiplier, then the working command storage decade shown in FIG. 2 is the most significant decade of the multiplier. Accordingly, if a three decade multiplier is utilized, flip-flops 271, 272, 274 and 278 are weighted 100, 200, 400 and 800. However, for this example, it suffices that there can be assumed a one decade multiplier whereby only a multiplication of a units pulse rate count is affected.

In accordance with the above, let it be assumed that there is a numerical command six in the working command storage, i.e., flip-flops 272 and 274 are in their one states. In this situation, the outputs on leads 272$h$ and 274$h$ respectively are, of course, binary zeros. Accordingly, there is pulse output on the output summation line 273 in the following alternative coincidence of conditions: Either flip-flop 261 is in its one state, flip-flop 262 is in its zero state and the gate pulse occurs on line 256 whereby a binary one appears on line 269 or flip-flops 261 and 264 are both in their zero states and the gate pulse appears whereby a binary one appears on line 270. If either of these conditions obtain, then there is a pulse output on output summation line 273. A numerical command, six in the working command storage signifies, of course, that for every ten input gate signals there will appear six pulses on the output summation line. Lines 291–300 in FIGS. 3A–3C show the respective waveforms appearing on output summation line 273 for numerical commands zero-nine respectively. It is seen that these waveforms are based on voltage levels and not on binary states. Lines 286–289 show the waveforms appearing on the output summation line for the one states of the individual respective flip-flops in the working command storage. These waveforms also are based upon voltage levels. Inspection of the waveforms of lines 286–289 shows that the waveforms of lines 291–300 are actually different combinations thereof. Thus, the waveform for the numerical command, six as shown in line 297 is the combination of the waveforms of lines 287 and 288.

The waveform of line 301 indicates the pulse output appearing on the output summation line from the less significant decades. For example, let it be assumed that a three decade pulse rate multiplier is utilized wherein the pulse rate multiplier counter portion of FIG. 2 is the least significant decade of the counter, i.e., the unit's decade, and the working command storage portion of FIG. 2 is the most significant decade thereof, i.e., the hundred's decade, the counter cycling completely in a thousand counts. Let it be further assumed that the numerical command number is 245 whereby it is intended that 245 pulses appear on output summation line 273 for every one thousand input gate pulses as shown on line 281. In this situation, with regard to the unit's decade of the pulse rate multiplier counter, a pulse will appear on the output summation line at every second and seventh input gate signal as shown in the waveform of line 293. With regard to the ten's decade of the pulse rate multiplier counter, a pulse will appear on output summation line 273 when that decade setting is 10, 30, 60 and 80 which is, of course, in accordance with the waveform of line 298. With regard to the hundred's decade of the pulse rate multiplier counter, the pulse appears on the output summation line when the setting in the hundred's decade of the pulse rate multiplier counter is 100, 300, 500, 600 and 800 which is, of course, in accordance with the waveform of line 296.

It is to be noted from inspection of waveforms shown in lines 291–300 of FIGS. 3A–3C, i.e., the numerical command waveforms, that the pulses therein are relatively symmetrically displaced with respect to each other. This results from the utilization of a binary coded decimal counter and a binary coded decimal working storage command in the pulse rate multiplier wherein the weightings of the respective flip-flops in the pulse rate multiplier counter are different from the weighting of the flip-flops in the working command storage. Particularly, in a counter wherein each decade is of the 1, 2, 4, 5 binary coded decimal type, and in the working command storage wherein each decade is of the 1, 2, 4, 8 binary coded decimal type, there results the generation of pulse trains in accordance with the substantial symmetry provided by the pulse train outputs of the 1, 2, 4 and 5 flip-flops of the counter during the cycling thereof whereby there is no undesirable bunching of pulses in the actual numerical command pulse train. If pulse rate multiplier counter 55 were chosen to be of the 1, 2, 4, 8 type, the same as the working command storage 57, then the situation would occur where there would be a pulse from the "1" flip-flop of the counter at every other input gate pulse; where there would be a pulse output from the "2" flip-flop at the second, third, sixth and seventh gate pulses; where there would be a single output from the "4" flip-flop which would last from the fourth through the seventh gate pulse; and where the "8" flip-flop would be in its one state for the eighth and ninth pulse.

With reference to the pulse rate multiplier of the velocity command, it has been shown how the selection of a 1, 2, 4, 5 weighting for the pulse rate multiplier counter flip-flops and the selection of a 1, 2, 4, 8 weighting for the working command storage flip-flops provide relatively evenly spaced pulse trains on the output summation line, the latter being the pulse trains representing the numerical commands. Also, the above weightings require a minimum of pulse multiplication gates to produce a relatively uniform pattern of pulses in the trains.

It has been found, that there is an advantage in utilizing a multiplier counter code which is different from the working command storage codes. Thus, in FIGS.

4A–4D, there are shown the waveform outputs of flip-flops in other type weightings of the pulse rate multiplier.

In FIGS. 4A–4D, lines 302 and 303 indicate a clock pulse train and a gate pulse train respectively with which the outputs of the elements of the multipliers are synchronized. The clock and gate pulse trains are shown in voltages. The flip-flop and gate multiplication gate outputs are shown in binary weighting, i.e., one and zero.

In FIGS. 4A–4D, lines 304–307 show the states of the flip-flops in a pulse rate multiplier counter wherein the flip-flops of each decade are weighted 1, 2, 4 and 8 respectively. Lines 308–311 show the patterns of pulses for an eight, a four, a two and a one command wherein there is utilized a 1, 2, 4, 8 counter and a 1, 2, 4, 8 working command storage. Line 312 shows the waveform of the carry pulse in this type multiplier.

Lines 313–316 show the patterns of pulses for a five, a four, a two and a one command respectively when a 1, 2, 4, 8 counter is utilized with a 1, 2, 4, 5 working command storage. Line 317 shows the carry pulse in this type multiplier.

Lines 318–321 show the patterns of pulses for a five, a two, a one and a one command respectively when a 1, 2, 4, 8 counter is utilized with a 5, 2, 1, 1 working command storage. Line 322 shows the carry pulse in this type multiplier.

Lines 323–326 show the patterns of pulses for a seven, a four, a two and one command respectively when a 1, 2, 4, 8 counter is utilized with a 7, 4, 2, 1 working command storage. Line 327 shows the carry pulse in this type multiplier.

Lines 328–331 show the waveforms of the flip-flop in a 1, 1, 2, 5 counter. Lines 332–336 show the patterns of pulses for an eight, a four, a two, and a one command when a 1, 1, 2, 5 counter is utilized with a 1, 2, 4, 8 working command storage. Line 336 shows the carry pulse in this type multiplier.

Lines 337–341 show the patterns of pulses for a five command, a four command, a two command and a one command when a 1, 1, 2, 5 counter is utilized with a 1, 2, 4, 5 storage command. Line 341 is the waveform of the carry pulse for this type multiplier.

Lines 342–346 show the patterns of pulses for a five command, a two command, a one command and a one command respectively when a 1, 1, 2, 5 counter is utilized with a 1, 1, 2, 5 working storage command. Line 346 shows the carry pulse for this type multiplier.

Lines 347–351 show the patterns of pulses for a seven command, a four command, a two command and a one command when a 1, 1, 2, 5 counter, is utilized with a 1, 2, 4, 7 working command storage. Line 351 shows the carry pulse for this type multiplier.

Lines 352–356 show the patterns of pulses for a five command, a four command, and a one command when a 1, 2, 4, 5 counter is utilized with 1, 2, 4, 5 working command storage. Line 356 is the carry pulse for this type multiplier.

Lines 357–361 show the patterns of pulses for a five command, a two command, a one command and a one command respectively when a 1, 2, 4, 5 counter is utilized with a 1, 1, 2, 5 working command storage. Line 361 shows the carry pulse in this type multiplier.

Lines 362–366 show the pattern of pulses for a seven command, a four command, a two command and a one command respectively when a 1, 2, 4, 5 counter is utilized with a 1, 2, 4, 7 working command storage. Line 366 shows the carry pulse in this type multiplier.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim as new and desire to secure by Letters Patent of the United States is:

1. In combination, a counter which cycles at a frequency in accordance with the frequency of a first pulse train applied thereto and in synchronism with a second pulse train applied thereto, said second pulse train having at least the frequency of said first pulse train, said counter comprising at least one decade, each decade comprising a given number of bistable stages, each of said stages having first chosen discrete weightings, a register adapted to have a numerical setting stored therein and comprising at least one decade, each of said register decades comprising said given number of bistable stages, each of said register stages having second chosen discrete weightings, a plurality of gating means equal in number to the number of decades, each of said gating means comprising a number of AND gates equal to said given number, each of said gates being individually associated with a stage of said register, means to connect one input of each AND gate to sense the static condition of the corresponding bistable stage of said register, means to connect other inputs of each AND gate to sense the static condition of at least two of said bistable stages of said counter, said gates being enabled in response to sensing coincidence of like static conditions, means to apply said second pulse train to each of said gates so as to operate the enabled gates in synchronism with said second pulse train under control of the information in said register so that each gate will provide in response to one complete cycle of the decade of the counter a train of pulses equal in number to the weighting of the corresponding stage of said register, and means for combining the outputs of all said gates to produce an output pulse train having a frequency equal to the frequency of said first pulse train multiplied by the ratio of the number of the setting in said register to the amount of pulses in said first pulse train applied to said counter during one cycle of said counter.

2. In combination, a counter which cycles at a frequency in accordance with the frequency of a first pulse train applied thereto and in synchronism with a second pulse train applied thereto, said second pulse train having at least the frequency of said first pulse train, said counter comprising at least one decade, each counter decade comprising one to four bistable stages respectively weighted one, two, four and five, a register adapted to have a numerical setting stored therein and comprising at least one decade, each of said register decades comprising one to four bistable stages respectively weighted one, two, four and eight, a plurality of gating means equal in number to the number of decades, each of said gating means comprising a number of AND gates equal to said given number, each of said gates being individually associated with a stage of said register, means to connect one input of each AND gate to sense the static condition of the corresponding bistable stage of said register, means to connect other inputs of each AND gate to sense the static condition of at least two of said bistable stages of said counter, said gates being enabled in response to sensing coincidence of like static conditions, means to apply said second pulse train to each of said gates so as to operate the enabled gates in synchronism with said second pulse train under control of the information in said register so that each gate will provide in response to one complete cycle of the decade of the counter a train of pulses equal in number to the weighting of the corresponding stage of said register, and means for combining the outputs of all said gates to produce an output pulse train having a frequency equal to said first pulse train frequency multiplied by the ratio of the number of the setting in said register to the amount of pulses in said first pulse train applied to said counter during one cycle.

3. In combination, a counter which cycles at a frequency in accordance with the frequency of a first pulse train applied thereto and in synchronism with a second pulse train applied thereto, said second pulse train having at least the frequency of said first pulse train, said counter comprising a plurality of decades, the counter decades other than the most significant counter decade comprising four bistable stages weighted one, two, four and five respectively, the most significant counter decade comprising first to fourth bistable stages weighted one, two, four and five respectively, a register adapted to have a numerical setting stored therein, said register comprising a plurality of decades, the register decades other than the most significant register decade comprising four bistable stages weighted one, two, four and eight respectively, the most significant register decade comprising first to fourth bistable stages weighted one, two, four and eight respectively, a plurality of gating means equal in number to the number of decades, each of said gating means comprising a number of AND gates equal to said given number, each of said gates being individually associated with a stage of said register, means to connect one input of each AND gate to sense the static condition of the corresponding bistable stage of said register, means to connect other inputs of each AND gate to sense the static condition of at least two of said bistable stages of said counter, said gates being enabled in response to sensing coincidence of like static conditions, means to apply said second pulse train to each of said gates so as to operate the enabled gates in synchronism with said second pulse train under control of the information in said register so that each gate will provide in response to one complete cycle of the decade of the counter a train of pulses equal in number to the weighting of the corresponding stage of said register, and means for combining the outputs of all said gates to produce an output pulse train in synchronism with said second pulse train and having a frequency equal to said first pulse train frequency multiplied by the ratio of the number of the setting in said register to the number of first train pulses applied to said counter during one cycle.

4. In the combination defined in claim 3 wherein a numerical setting of eight in a register decade producing a pulse train at the output of the associated gate having pulses occurring at the first through the fourth and sixth through the ninth pulses of said first train during a cycle of the corresponding counter decade, a numerical setting of four in a register decade producing a pulse train at the output of the associated gate having pulses occurring at the first, third, sixth and eighth first train pulses during a cycle of the corresponding counter decade, a numerical setting of two in a register decade producing a pulse train at the output of the associated gate having pulses occurring at the second and seventh pulses of said first train during a cycle of the corresponding counter decade and a numerical setting of one in a register decade producing a pulse train at the output of the associated gate having pulses occurring at the fifth pulse of said first train pulse during a cycle of the corresponding counter decade, said combining means effecting the combining of the pulse trains at the output of each gate to produce collective output pulse trains during a cycle of said counter decade having from zero to nine pulses therein and occurring in accordance with the occurrence of the pulses in said individual pulse trains.

5. In combination, a counter comprising a plurality of bistable stages, a first register for containing therein a numerical setting, means in circuit with said counter and said first register for selectively combining the outputs of the stages comprising said counter in accordance with the setting in said first register, a second register for containing a numerical setting, means in circuit with said first and second registers for comparing the values of the settings therein to produce a first output signal therefrom when the greater value setting is in said first register and a second output signal therefrom when the greater value setting is in said second register, and means, in circuit with said first register which when enabled and in response to said output signal effects a setting in said first register equal to the setting in said second register.

6. In combination, a counter comprising a given number of decades, each of said decades comprising a prescribed number of bistable stages, a reversible counter comprising said given number of decades, each of said reversible counter decades comprising said prescribed number of bistable stages, said reversible counter being adapted to have stored therein a numerical setting, means in circuit with said counter and said reversible counter for selectively combining the outputs of the stages comprising said counter in accordance with a numerical setting stored in said reversible counter, a register containing a numerical setting therein, comparing means in circuit with said reversible counter and said register for producing a first output signal when the value of the reversible counter setting exceeds the value of the register setting and a second output signal when the value of the register setting exceeds the value of the reversible counter setting, means in circuit with said reversible counter which when enabled and in response to said output signal effects counting by said reversible counter in the direction to equal the setting in said register, and means responsive to the equality of the setting values in said reversible counter and said register to remove said signal as an applied input to said reversible counter.

7. In combination, a counter comprising a given number of decades, at least each of said decades other than the most significant decade comprising a chosen number of bistable stages, a first register arranged to function as a reversible counter and comprising said number of decades, at least each of said first register decades other than the most significant decade comprising said chosen number of bistable stages, said first register being adapted to contain a numerical setting therein, a first pulse source having a first chosen frequency, a second pulse source having a second chosen frequency not exceeding said first frequency, means for applying the outputs of said first and second pulse sources to said counter to cause said counter to cycle at a rate in accordance with the frequency of said second pulse source and in synchronism with said first pulse source, means in circuit with said counter and said first register for selectively combining the outputs of the stages comprising said counter in accordance with the numerical setting in said first register to provide an output pulse train in synchronism with said first pulse source and having a frequency equal to the frequency of said second pulse source multiplied by the ratio of the value of the setting in said first register to the amount of pulses from said second source required for a cycle of said counter, a second register adapted to contain a numerical setting therein, comparing means in circuit with said first and second registers for producing a first signal when the first register setting value exceeds the second register setting value and a second signal when the second register setting value exceeds the first register setting value, a third pulse source in synchronism with said first and second pulse sources and having a third chosen frequency not exceeding said first frequency in circuit with said first register equalizing means in circuit with said first register which when enabled and in response to said signal effects counting in said first register to the value of said second register at the frequency of said third pulse source and in synchronism with said first pulse source, and means responsive to the equalization of the setting values of said first and second registers to disable said equalizing means.

8. In the combination defined in claim 7 wherein the outputs of a decade of a given order of ascending significance in said counter are selectively combined by said combining means in accordance with the setting in the decade of said first register of said given order of descending significance.

9. In the combination defined in claim 8 wherein said counter decades comprise four bistable stages having respective discrete first chosen weightings and wherein said first register decade comprise four bistable stages having respective second discrete chosen weightings different from said first chosen weightings.

10. In the combination defined in claim 9 wherein said second register comprises a number of decades equal to the number of decades in said first register, wherein each decade of said second register comprises four bistable stages having said discrete second chosen weightings and wherein the settings of equal order of significance decades of said first and second registers are compared in said comparing means.

11. In the combination defined in claim 10 wherein the weightings of the stages in a counter decade are one, two, four and five respectively and wherein the weightings of the stages in a register are one, two, four and eight respectively.

12. In the combination defined in claim 11 wherein said comparing means is a binary coded decimal comparator having the outputs of the first and second registers applied thereto.

13. In the combination defined in claim 12 wherein said comparator has first and second outputs, a unidirectional potential signal of a first level appearing at said first output when said first register setting value exceeds said second register setting value, a unidirectional potential signal of a second value appearing at said first output when said second register setting value exceeds said first register setting value, said first level signal appearing at said second output when said second register setting value exceeds said first register setting value, and said second level signal appearing at said second output when said first register setting value exceeds said second register setting value.

14. In combination, a pulse source for producing a first pulse train having a first frequency, a first pulse rate multiplier for producing a second pulse train having a frequency that is an adjustable fraction of said first frequency, means for applying said first pulse train to said first pulse rate multiplier to produce said second pulse train in synchronism with said first pulse train, a second pulse rate multiplier for producing a third pulse train having a frequency which is a selected fraction of said second frequency, and means for applying said first and second pulse trains to said second pulse rate multiplier to produce said third pulse train and which is in synchronism with both said second and first pulse trains.

15. In the combination defined in claim 14 wherein said first pulse rate multiplier comprises a binary counter having a predetermined number of bistable stages, each of said stages capable of being in a binary one voltage level and binary zero voltage level output state, a register comprising an amount of columns equal to said bistable stage number and an amount of rows equal to the amount of first train pulses required for said counter to cycle, each row comprising all of said columns, each of said rows being representative of a discrete binary digit, successive progressive values of binary digits occurring in successive rows, a voltage source for providing a binary zero level, means in circuit with said source and adapted to selectively contact any of said rows to provide a binary zero output from a contacted row, and means for combining the outputs of the stages of said counter in accordance with the value of the binary digit of a contacted row to provide said second pulse train having the frequency of said first pulse train multiplied by the ratio of the value of the binary digit of said contacted row to the amount of pulses required for said binary counter for one complete cycle.

16. In the combination defined in claim 15 wherein said binary counter comprises four bistable states weighted one, two, four and eight respectively, wherein said register comprises four columns weighted one, two, four and eight respectively, one row having a zero value and the other rows having, progressively, values of one to fifteen.

17. In combination, a first pulse source for producing a first pulse train having a first frequency, a first pulse rate multiplier for producing a second pulse train having a frequency that is a first fraction of said first frequency and in synchronism therewith, said first pulse rate multiplier including means associated therewith for selectively adjusting said first fraction, a second pulse rate multiplier for producing a pulse train whose frequency is a selected fraction of the frequency of a pulse train applied thereto, means for applying said first and second pulse trains to said second pulse rate multiplier for producing therefrom a third pulse train whose frequency is said selected fraction of said second frequency and which is in synchronism with said first pulse train, said second pulse rate multiplier comprising a counter comprising a number of bistable stages to which said first and second pulse trains are applied, a first register arranged to function as a reversible counter for containing a numerical setting, and means in circuit with said counter and said first register for combining the oututs of said states in accordance with said numerical setting, a second register for containing a numerical setting, comprising means in circuit with said first and second registers for producing a first signal when said first register setting exceeds said second register setting and a second signal when said second register setting exceeds said first register setting, a second pulse source, equalizing means in circuit with said first register which when enabled and in response to said signal produces counting in said first register in the direction to equal the setting in said second register.

References Cited by the Examiner
UNITED STATES PATENTS

| | | | |
|---|---|---|---|
| 2,913,179 | 11/1959 | Gordon | 235—164 |
| 2,922,940 | 1/1960 | Mergler | 318—162 |
| 2,951,202 | 8/1960 | Gordon | 324—79 |
| 2,951,986 | 9/1960 | Gordon | 324—79 |
| 3,069,608 | 12/1962 | Forester et al. | 318—162 |
| 3,079,522 | 2/1963 | McGarrell | 318—162 |

FOREIGN PATENTS 1,214,467 11/1959 France.

References Cited by the Applicant
UNITED STATES PATENTS

| | | |
|---|---|---|
| 2,820,187 | 1/1958 | Parsons et al. |
| 2,833,941 | 5/1958 | Rosenberg et al. |
| 2,864,010 | 12/1958 | Rosenberg et al. |
| 2,896,514 | 7/1959 | Rosenberg. |
| 2,922,940 | 1/1960 | Mergler. |
| 2,927,735 | 3/1960 | Scuitto. |
| 2,933,249 | 4/1960 | Scuitto. |
| 2,943,248 | 6/1960 | Ritchey. |

OTHER REFERENCES

Electrical Manufacturing, November–December 1954, "Adapting Digital Techniques for Automatic Controls-I," B. M. Gordon.

MAYNARD R. WILBUR, *Primary Examiner.*

J. F. MILLER, *Assistant Examiner.*